US012228719B2

(12) United States Patent
Schumann et al.

(10) Patent No.: US 12,228,719 B2
(45) Date of Patent: Feb. 18, 2025

(54) DEVICE AND METHOD FOR IMAGING AN OBJECT

(71) Applicant: LEICA MICROSYSTEMS CMS GMBH, Wetzlar (DE)

(72) Inventors: Christian Schumann, Lich (DE);
Christian Schulz, Huettenberg (DE);
Arnold Mueller-Rentz, Brechen (DE);
Andreas Lotter, Braunfels (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 487 days.

(21) Appl. No.: 17/636,034

(22) PCT Filed: Aug. 27, 2019

(86) PCT No.: PCT/EP2019/072786
§ 371 (c)(1),
(2) Date: Feb. 17, 2022

(87) PCT Pub. No.: WO2021/037342
PCT Pub. Date: Mar. 4, 2021

(65) Prior Publication Data
US 2022/0283422 A1    Sep. 8, 2022

(51) Int. Cl.
*G02B 21/18* (2006.01)
*G02B 21/04* (2006.01)
(Continued)

(52) U.S. Cl.
CPC .............. *G02B 21/18* (2013.01); *G02B 21/04* (2013.01); *G02B 21/33* (2013.01); *G02B 21/361* (2013.01)

(58) Field of Classification Search
CPC ........ G02B 21/18; G02B 21/04; G02B 21/33; G02B 21/361; G02B 2207/114;
(Continued)

(56) References Cited

U.S. PATENT DOCUMENTS 5,334,830 A * 8/1994 Fukuyama ......... G02B 21/0048
250/234
7,583,300 B2   9/2009 Nanjo et al.
(Continued)

FOREIGN PATENT DOCUMENTS

| CN | 1533511 A | 9/2004 |
|---|---|---|
| EP | 1 887 402 A2 | 2/2008 |

(Continued)

OTHER PUBLICATIONS

Machine translation of JP-2012203047-A (Year: 2012).*
(Continued)

*Primary Examiner* — Darryl J Collins
*Assistant Examiner* — Matthew Y Lee
(74) *Attorney, Agent, or Firm* — LEYDIG, VOIT & MAYER, LTD.

(57) ABSTRACT

An optical imaging device for a microscope includes an objective and an optical system configured to interact with the objective for optically imaging an object selectively in a first operating mode and a second operating mode. The optical system includes a first optical subsystem associated with the first operating mode, and a second optical subsystem associated with the second operating mode. The first optical subsystem is configured to form a first image of the object with a first magnification. The second optical subsystem is configured to form a second image of the object with a second magnification that is less than the first magnification. The second optical subsystem includes an optical module insertable into the optical path for selecting the second operating mode. The optical module includes a lens element with a positive refractive power.

17 Claims, 1 Drawing Sheet

(51) Int. Cl.
*G02B 21/33* (2006.01)
*G02B 21/36* (2006.01)

(58) Field of Classification Search
CPC .... G02B 15/12; G02B 21/025; G02B 21/248; G02B 21/06; G02B 21/0076; G02B 21/0032; G02B 21/00; G02B 21/26; G02B 21/0088; G02B 21/02
See application file for complete search history.

(56) References Cited

U.S. PATENT DOCUMENTS

| | | | | |
|---|---|---|---|---|
| 2007/0268574 | A1* | 11/2007 | Sasaki | G02B 21/0044 |
| | | | | 359/385 |
| 2008/0030849 | A1* | 2/2008 | Fukuyama | G02B 21/33 |
| | | | | 359/381 |
| 2011/0261446 | A1* | 10/2011 | Dunsby | G02B 21/16 |
| | | | | 359/380 |
| 2012/0050851 | A1* | 3/2012 | Euteneuer | G02B 21/248 |
| | | | | 359/381 |
| 2015/0015942 | A1 | 1/2015 | Steinmeyer et al. | |
| 2017/0371136 | A1* | 12/2017 | Shimada | G02B 21/0032 |
| 2019/0113730 | A1* | 4/2019 | Yamazaki | G02B 21/0088 |
| 2020/0211233 | A1* | 7/2020 | Siegel | G06F 3/013 |
| 2022/0387127 | A1* | 12/2022 | Kao | G02B 21/025 |

FOREIGN PATENT DOCUMENTS

| | | | |
|---|---|---|---|
| JP | H08190056 | A | 7/1996 |
| JP | H11 183124 | A | 7/1999 |
| JP | 2000056232 | A | 2/2000 |
| JP | 2008039918 | A | 2/2008 |
| JP | 2008225096 | A | 9/2008 |
| JP | 2012203047 | A * | 10/2012 |
| JP | 2016161600 | A | 9/2016 |
| WO | 2019/073190 | A1 | 4/2019 |

OTHER PUBLICATIONS

Nikon, "Infinity Optical Systems," MicroscopyU, Jul. 1, 2017 (Jul. 1, 2017), XP055688006, Nikon, Online, pp. 1-6.

Anonymous, "Vignetting," Wikipedia, US, Aug. 14, 2019 (Aug. 14, 2019), XP055689183, pp. 1-4.

* cited by examiner

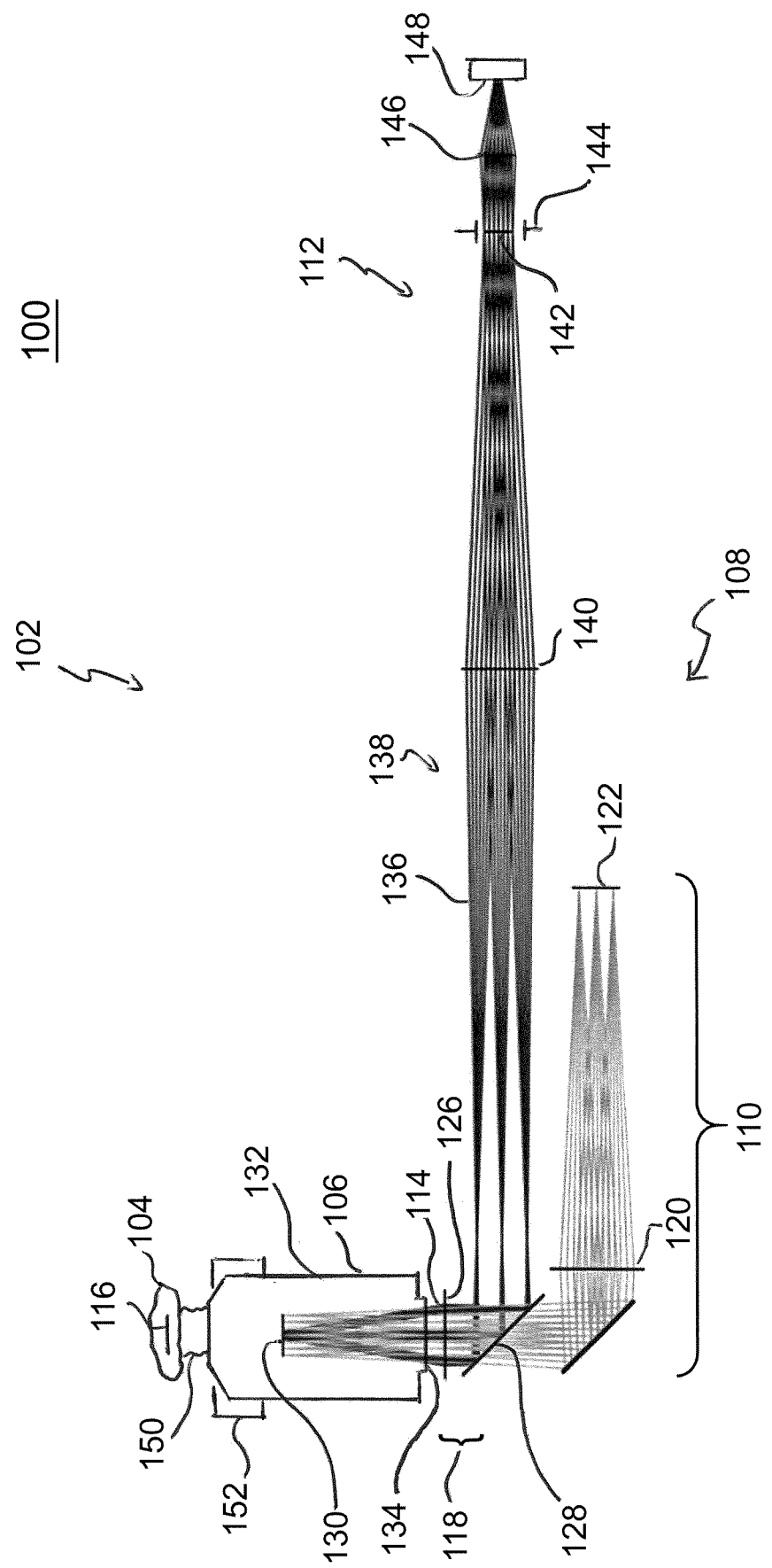

DEVICE AND METHOD FOR IMAGING AN OBJECT

CROSS REFERENCE TO RELATED APPLICATIONS

This application is a U.S. National Phase application under 35 U.S.C. § 371 of PCT International Application No. PCT/EP2019/072786, filed on Aug. 27, 2019. The PCT International Application was published in English on Mar. 4, 2021 as WO 2021/037342 A1 under PCT Article 21(2).

FIELD

The present invention relates to an optical imaging device for a microscope, comprising an objective configured to collect detection light from an object and to focus said detection light into an optical path. Further, the invention relates to a method for imaging an object.

BACKGROUND

Finding an object to be imaged by means of a microscope may be a demanding task. Especially in microscope systems, in which a change of the objective is not possible or only with severe restrictions, finding the object may be a significant challenge. This is particular the case when an immersion objective with a long working distance is used in an inverse microscope configuration. Even when using an automatic immersion dispenser, there is a risk that applying or removing the immersion medium destroys the correlation between imaging situations in which different objectives are used.

When using a microscope system having relatively high magnification and high numerical aperture, both the lateral dimensions of the object field to be imaged and the axial depth of field are relatively small. For enlarging the object field in particular, it would therefore be necessary to switch to a different objective with lower magnification and lower numerical aperture. For the reasons given above, however, changing the objective is associated with severe disadvantages, in particular when using an immersion-based microscope system.

The situation becomes even more complicated when using a microscope in which the imaging configuration deviates from the usual configuration focusing on an object plane which is parallel to the surface of the microscope stage. For instance, recently light sheet microscopy techniques as e.g. oblique plane microscopy (OPM) have been developed in which the imaged object plane is tilted relative to the surface of the specimen carrier. Such a tilt of the object plane enables illumination and detection through a transparent bottom of a specimen carrier in accordance with a geometry in which illumination light and detection propagate orthogonally to each other.

Conventional microscope tubes may comprise image inverting magnification changers allowing the numerical aperture to be reduced when imaging the object. However, the object field imaged by these tube systems is relatively small. In particular, the object field is too small to allow a complete microtiter cavity of a well plate to be imaged, such a cavity having lateral dimensions in the order of a few millimeters. Further, an object-side focusing is necessary to find an object along the optical axis. Such an object-side focusing raises problems in inverted microscope systems comprising an immersion objective with a large working distance. Thus, when performing the object-focusing it may be difficult to retain the immersion medium as desired in a space between the specimen and the front lens of the objective.

SUMMARY

In an embodiment, the present disclosure provides an optical imaging device for a microscope. The optical imaging device includes an objective configured to collect detection light from an object and to guide the detection light into an optical path, and an optical system comprising a plurality of lens elements configured to interact with the objective for optically imaging the object selectively in a first operating mode and a second operating mode. The optical system includes a first optical subsystem associated with the first operating mode. The first optical subsystem is configured to form a first image of the object with a first magnification. The optical system includes a second optical subsystem associated with the second operating mode. The second optical subsystem is configured to form a second image of the object with a second magnification. The second magnification is less than the first magnification. The second optical subsystem includes an optical module insertable into the optical path for selecting the second operating mode. The optical module includes a lens element with a positive refractive power, causing the second magnification to be less than the first magnification by being closer to an exit pupil of the objective than other lens elements of the optical system when the optical module is inserted into the optical path.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 is a schematic diagram showing a microscope according to an embodiment.

DETAILED DESCRIPTION

Embodiments of the present invention provide an optical imaging device for a microscope and a method enabling an object to be found more easily in order to subsequently form an optical image of the object.

The optical imaging device comprises an objective configured to collect detection light from an object and to guide said detection light into an optical path, and an optical system comprising a plurality of lens elements configured to interact with said objective for optically imaging said object selectively in a first operating mode and a second operating mode. The optical system comprises a first optical subsystem associated with said first operating mode, said first optical subsystem being configured to form a first image of said object with a first magnification. The optical system comprises a second optical subsystem associated with said second operating mode, said second optical subsystem being configured to form a second image of said object with a second magnification. The second magnification is smaller than the first magnification. The second optical subsystem comprises an optical module insertable into the optical path for selecting the second operating mode. The optical module comprises a lens element with positive refractive power causing the second magnification to be smaller than the first magnification by being closer to an exit pupil of the objective than the other lens elements of the optical system when inserted into the optical path.

The optical imaging device provides for two different operating states which are used for imaging the object with two different magnifications. Specifically, the first operating mode may be used to provide a high magnification close-up image of a region of interest (ROI) which had been found before the actual image acquisition. In order to find this ROI, the second operating mode may be used providing a low magnification overview image in which the ROI is included. Accordingly, the optical imaging device enables a user to find an object to be imaged more easily. In particular, the user is not forced to change the objective. This is particularly advantageous when using an immersion-based microscope system as there is no need to supply or remove an immersion medium when acquiring the images with low and high magnifications. Accordingly, the imaging situation does not change fundamentally, and the two images can be easily correlated with each other.

The avoidance of an objective change is particularly advantageous in configurations that deviate from the usual imaging configurations where the optical system is focused onto a plane parallel to the surface of the microscope stage. For instance, the optical imaging device may be used advantageously in light sheet microscopes, e.g. OPMs, in which the optical system is focused onto an object plane which is tilted relative to the surface of the microscope stage as illumination and detection need to be orthogonal to each other.

Further, the optical imaging device is particularly suitable for imaging a complete microtiter cavity of a well plate comprising a plurality of such cavities. Thus, in a first step, a specific cavity may be imaged as a whole by applying the second operating mode in which image acquisition is performed based on a lower magnification. Subsequently, in a second step, the cavity thus found may be examined in detail by applying the first operating mode being based on a higher magnification.

Switching between the first and second operating modes is achieved by selectively inserting an optical module into the optical path, said optical module being a part of the second optical subsystem which is associated with the second operating mode. In other words, when the optical module is inserted into the optical path, the second operating mode is selected. In contrast, when the optical module is retracted from the optical path, the first operating mode is selected. Accordingly, by controlling the optical module, the user can easily switch between the two modes.

In order to create a large object field to be imaged in the second operating mode, the optical module comprises a lens element with positive refractive power. This positive lens element is positioned closer to an exit pupil of the objective than the other lens elements of the optical system when the optical module is inserted into the optical path. Arranging the positive lens element of the optical module close to the exit pupil of the objective ensures the detection light to be collected by the positive lens element at a location where field angles of the detection light are moderate, i.e. not too large. Accordingly, the size of the optical elements can be limited rendering the optical imaging device compact. Specifically, there is no need to provide a high numerical aperture objective with a particularly long focal length in order to achieve a large object field, such an objective being very expensive. In contrast, the claimed optical imaging device allows to use an objective having a high numerical aperture and being corrected for an infinite optical tube length, wherein the objective may have a moderate focal length which is advantageous in terms of compactness and costs.

The imaging device may comprise a suitable mechanism for inserting the optical module into the optical path and to remove the it therefrom. For example, a motorized actuator may be provided for pivoting the module.

Preferably, the optical module further comprises a light deflector configured to branch an optical side path from said optical path when inserted into said optical path, said second image being formed in said optical side path. The aforementioned optical side path may be used in the second operating mode as a separated optical path for creating an overview image which enables the user to find a distinct object, e.g. a specific microtiter cavity of a well plate, or a specific region of interest (ROI) of a larger object. In contrast, the optical path being effective in the first operating mode may be used to create a close-up image of the object determined in the first operating mode.

In a preferred embodiment, the second optical subsystem comprises a Keplerian telescope system having a first, most object-side lens element being formed by said lens element with positive refractive power included in the optical module. Accordingly, by switching the optical module into the optical path, a telescope system is created which can be used for forming an overview image. In particular, when switching the optical module into the optical path, the first optical subsystem remains unchanged. As the first optical subsystem operates with higher magnification for achieving high quality imaging, it is more sensitive to any adjustment than the second optical subsystem. Therefore, it is advantageous to leave the first optical subsystem essentially unchanged when switching between the operating states. Accordingly, the optical imaging device uses the movable optical module of the second optical subsystem for switching.

The Keplerian telescope system may be configured to form an image of the exit pupil. By using such a telescope being an afocal optical system having a real intermediate pupil, a number of options is provided for integrating additional optical components into the microscope. For example, components may be integrated which are used to implement epifluorescence illumination. Further, phase filters for implementing contrast methods may be integrated.

Specifically, the second optical subsystem may comprise an aperture stop located in a position of said image of the exit pupil, said image being formed as a real image.

The Keplerian telescope system may comprise a second lens element with positive refractive power configured to collimate light bundles of the detection light, each light bundle being associated with a single point of an object field from which the objective collects the detection light. In a specific embodiment, a field lens may be additionally provided between the first positive lens element and the second positive lens element of the telescope system.

The Keplerian telescope system being comprised by the afore-mentioned two positive lens elements serves to scale the focal length of the objective by a factor which is given by the afocal factor of the telescope system. Further, the Keplerian telescope system serves to form a real image of the exit pupil of the objective. As it may be expected that vignetting cannot be avoided from occurring in the objective, the aperture stop is used to stop down the imaged exit pupil. Accordingly, the aperture stop is used to achieve some sort of homogenization of the optical path within the second optical subsystem.

In particular, the Keplerian telescope system is to be considered as a magnification reducing system in relation to the normal usage of the objective in connection with a tube lens having a reference focal length. Thus, the magnification of the objective has to be related to a nominal focal length of the tube lens. Assumed as an example that the focal length of the tube lens is 200 mm and the focal length of the objective is 10 mm, the objective has a magnification of 20. Further, assumed that the Keplerian telescope system has an afocal factor of 4, the magnification of the objective is effectively reduced from 20 to 20/4, i.e. 5.

The second optical subsystem may comprise an image sensor located in said image plane. The image sensor may e.g. be formed by a CCD or CMOS camera.

Preferably, at least one of the lens elements of the second optical subsystem is configured to correct residual aberration of said lens element with positive refractive power included in the optical module. According to this embodiment, without providing a fully corrected intermediate image within the Keplerian telescope system, the first positive lens element of the telescope system, i.e. the positive lens element being included in the optical module, is designed as simple as possible in order to reduce the size thereof, and the correction of aberrations is achieved by the remaining part of the second optical subsystem, e.g. by the second positive lens element of the Keplerian telescope system and/or by the tube lens.

The tube lens may be formed by an optical system being similar an objective having low magnification. Preferably, the second magnification is in a range from 1.0 to 2.5. Further, the second magnification may be determined to be essentially equal to the ratio of an object-side refractive index and an image side refractive index. In case of under-sampling, i.e. in case that the image side-aperture of the magnifying optical path associated with the second optical subsystem is not completely sampled, the match of the refractive index ratio does not need to be very precise. In this case, aberration will be moderate, and an image-side focusing may be provided, e.g. by shifting the image sensor of the second optical subsystem along the optical axis. By applying an image-side focusing rather than an object-side focusing, problems may be avoided that would otherwise occur when focusing an immersion objective with a large working distance in an inverted microscope system. Accordingly, in a preferred embodiment, the second optical system is configured to perform an image-side focusing onto the object.

The second optical subsystem may further be configured to perform the image-side focusing such that an object-side defocusing in the amount of 5 mm being compensated by the image-side focusing results in a predetermined integral light intensity received by one pixel of an image sensor included in the second optical subsystem, said predetermined integral light intensity being not less than 50% of an integral reference light intensity received by said pixel in a nominal focus state of the second optical system, i.e. in a state without object-side or image-side defocusing. Thus, an efficient image-side defocusing can be achieved taking into account any undersampling.

Preferably, the objective is formed by an immersion objective. As explained above, the optical imaging device allows to avoid any change of the objective, which is particularly advantageous when using an immersion-based system.

As the objective is used in both operating states, according to a preferred embodiment, a dispenser may be provided for supplying an immersion medium to the objective.

Preferably, the optical imaging device satisfies at least one of the following conditions:

$f \leq 30$ mm; (1)

$NA \geq 0.8$; (2)

$FAA \geq 1$ mm; (3)

$d \leq 30$ mm; (4)

$D > 4.5$ mm; (5)

wherein f designates a focal length of the objective;

NA designates a full numerical aperture of the objective in the second operating mode;

FAA designates a free working distance;

d designates a distance from said lens element with positive refractive power to an image-side end of the objective; and D designates a diameter of an object field from which the objective collects the detection light.

According to another aspect, a microscope is provided which comprises an optical imaging device as described above. The invention may be applied to any type of microscope, e.g. a wide field microscope, a confocal microscope, a multi photon microscope and a light sheet microscope, in particular in OPM or SCAPE configuration.

According to another aspect, a method for imaging an object is provided, comprising the following steps: collecting detection light from the object and focusing the detection light into an optical path by means of an objective; and selectively imaging the object in a first operating mode and a second operating mode by means of an optical system comprising a plurality of lens elements interacting with the objective. A first image of the object is formed with a first magnification in the first operating mode. A second image of the object is formed with a second magnification in the second operating mode. The second magnification is smaller than the first magnification. An optical module is inserted into the optical path for selecting the second operating mode. The optical module comprises a lens element with positive refractive power causing the second magnification to be smaller than the first magnification by being closer to an exit pupil of the objective than the other lens element of the optical system when inserted into the optical path.

FIG. 1 shows a microscope 100 comprising an optical imaging device 102 which is configured to form an optical image of an object 104. It is to be noted that FIG. 1 serves only for illustrating those features of the microscope 100 which may help to understand the operating principle of the optical imaging device 102 being part of the microscope 100. Needless to say that the microscope 100 may comprise additional components not shown in FIG. 1.

The imaging device 102 comprises an objective 106 facing the object 104 which is positioned on a specimen carrier not shown in FIG. 1. Further, the imaging device 102 includes an optical system 108 comprising first and second optical subsystems 110, 112 which will be described in more detail below.

The objective 106 serves to collect detection light from the object 104 and to focus detection light into an optical path 114. In particular, the objective 106 captures detection light from an object field 116 which is located in an object plane coincident with an object-side focal plane of the objective 106. Thus, the objective 106 interacts with the optical system 108 in order to form an optical image of the object field 116.

The objective 106 may be a lens commonly used for both illumination and detection. Thus, the microscope 100 may comprise additional optical components not shown in FIG. 1, these components being configured to feed the objective 106 with light for illuminating the object 102. Alternatively or additionally, the microscope 100 may comprise a separate optical arrangement for illuminating the object 104.

The optical imaging device 102 provides for two different operating modes, a first mode being associated with the first optical subsystem 110 and a second mode being associated with the second optical subsystem 112. In particular, the first optical subsystem 110 is used to form a first optical image of the object 104 with a first magnification in the first operating mode. Likewise, the second optical subsystem 112 is used to form a second optical image of the object 104 with a second magnification in the second operating mode, wherein the second magnification is smaller than the first magnification. Providing distinct operating modes with different magnifications enables a user e.g. to acquire a low magnification overview image (corresponding to the aforementioned second image) in a first step in order to find a suitable ROI within the object 104 which shall be subsequently imaged. After the ROI has been found, a high magnification image of the ROI (corresponding to the aforementioned first image) is acquired in a second step. In other words, the object field 116 imaged in the second operating mode is larger than in the first operating mode. Accordingly, there is no need for the user to change the objective 106 when switching the magnifications based on which image acquisition shall be performed.

According to the specific embodiment shown in FIG. 1, the first optical subsystem 110 associated with the first operating mode is formed by lens elements as commonly used in wide-field microscopy. These lens elements may e.g. include a tube lens 120 focusing an image created by the objective 106 onto an image plane 122. The first optical subsystem 110 is depicted in simplified form in FIG. 1, and the first optical subsystem 110 may comprise additional optical components not shown in FIG. 1. For example, further lens elements may be provided to optically transport an intermediate image, which is created by the objective 106 in the image plane 122, to an image sensor. Alternatively, an image sensor may be provided directly in the image plane 122. In any case, it is to be noted that any other optical configuration may be applied, which is suitable to cooperate with the objective 106 for optically imaging the object 104. Also, a scanning arrangement (e. g. a confocal scanner or multiphoton scanning arrangement) can be used to scan the image plane 122.

The second optical subsystem 112 associated with the second operating mode comprises an optical module 118 which is selectively insertable into the optical path 114. For this purpose, the optical module 118 may be formed by a pivotable optical component, and the microscope 100 may comprise a suitable mechanism configured to swivel the optical module 118 into the optical path 114 and retract it therefrom for switching between the first and second operating modes.

The optical module 118 includes a lens element 126 having positive refractive power. Further, the optical module 118 may comprise a light deflector 128 formed e.g. by a mirror. Being integrated in the optical module 118, the lens element 126 and the light deflector 128 are integrally pivotable into the optical path 114 and retractable therefrom when the optical module 118 is correspondingly moved for selectively switching between the first and second operating modes.

In the first operating mode, the optical module 118 is retracted from the optical path 114. Accordingly, the second optical subsystem 112 is switched inactive, and the first optical subsystem 110 is used for image acquisition in the first operating mode. For this purpose, the first optical subsystem 110 interacts with the objective 106 in order to form the first image in accordance with the first magnification. Specifically, according to the configuration of FIG. 1, the first image is created in the image plane 122. As mentioned above, the first image may be a high magnification close-up image of a selected ROI.

In the second operating mode, the optical module 118 is inserted into the optical path 114. Accordingly, the light deflector 128 prevents the detection light propagating along the optical path 114 from transmitting to the first optical subsystem 110, and the first optical subsystem 110 is switched inactive. Rather, the second optical subsystem 112 is switched active in the second operating wherein the second optical subsystem 112 interacts with the objective 106 to create the second optical image in accordance with the second magnification. As already mentioned above, the second magnification is smaller than the first magnification applied in the first operating mode, and the second image may be a low magnification overview image which is used to find a suitable ROI.

As can be seen from FIG. 1, in case that the optical module 118 is inserted into the optical path 114, the lens element 126 integrated with the optical module 118 is closer to the objective 106 than any other lens element being included in the optical system 108. As mentioned above, the optical system 108 comprises both the first optical subsystem 110 and the second optical subsystem 112 being associated with the first and second operating modes, respectively. In particular, the lens element 126 is positioned as close as possible to an exit pupil 130 of the objective 106. According to the specific embodiment shown in FIG. 1, the exit pupil 130 is located within a housing 132 of the objective 106. Accordingly, the lens element 126 of the optical module 118 is positioned as close as possible to an end surface 134 of the housing 132, possibly taking into account any focusing movement of the objective 106 relative to the object 104 varying the distance between the end surface 134 of the housing 132 and the lens element 126.

As the positive lens element 126 is positioned at a short axial distance from to the exit pupil 130 of the objective 106, the detection light is collected by the lens element 126 at a location where the lateral spread of the light bundles caused by the large field angles of the detection light are relatively small. Thus, the lens element 126 can be made correspondingly small. In particular, it is not necessary to use a high numerical aperture objective with a large focal length, such a large focal length rendering a microscope objective very expensive.

As can be seen in FIG. 1, the light deflector 128 branches an optical side path 136 from the optical path 114 leading from the exit pupil 130 of the of the objective 106 to the light deflector 128. The optical side path 136 may be considered as an optical overview path used in the second operating mode for creating the low magnification overview image based on which a suitable ROI is to be found. In contrast, without branching off the optical side path 136, the optical path 114 as a whole may be considered as an optical main path used in the first operating mode for creating the high magnification close-up image of the selected ROI.

According to the specific embodiment shown in FIG. 1, the second optical subsystem 112 comprises a Keplerian telescope system 138 including two lens elements, each of which having positive refractive power. A first of these two lens elements is formed by the lens element 126 being part of the optical module 118. A second lens elements of the telescope system 138 is formed by an element 140 located downstream of lens element 126 along the optical side path 136. In other words, when inserting the optical module 118 into the optical path 114, the lens elements 126 and 140 are combined to form the Keplerian telescope system 138 which is switched active in the second operating mode.

The Keplerian telescope system 138 is configured to form a real image 142 of the exit pupil 130 of the objective 106 in the optical side path 136. Specifically, the real image 142 of the exit pupil 130 is created downstream of the second lens element 140 of the Keplerian telescope system 138. An aperture stop 144 may be provided in a position of the real image 142 of the exit pupil 130. Further, along the optical side path 136 downstream of the aperture stop 144, the second optical subsystem 112 may include a tube lens 146 and an image sensor 148. The tube lens 146 is configured to focus the detection light propagating through the optical side path 136 onto the image sensor 148, thus forming the second image based on the second magnification.

The second optical element 140 of the Keplerian telescope system 138 collimates the detection light passing therethrough, each light bundle of the detection light being associated with a single point of the object field 116. In this respect, it is to be noted that the Keplerian telescope system 138 may further comprises a field lens not shown in FIG. 1, such a field lens being located between the two positive lens elements 126, 140.

The aforementioned the aperture stop 144 may be used to stop down the imaged exit pupil 130 of the objective 106. Thus, detrimental effects caused by vignetting or aberrations occurring in the objective at large field angles and high numerical apertures can be prevented from occurring in the optical side path 136.

According to the embodiment shown in FIG. 1, the second positive lens element of the Keplerian telescope system 138 and/or the tube lens 146 may be corrected for aberrations rather than the positive lens element 126 integrated in the optical module 118 and forming the first lens of the Keplerian telescope system 138. Thus, the corrected lens element 138, 146 is used for correcting residual aberrations caused by the positive lens element 126 of the optical module 118.

The configuration shown in FIG. 1 provides for an additional infinity optical path between the Keplerian telescope system 138 and the tube lens 146, said additional infinity optical path comprising a real intermediate pupil in form of the real image 142 of the exit pupil 130. The additional infinity optical path may be used for integrating additional optical components into the microscope 100, e.g. components for epifluorescence illumination, phase filters, phase modulators, etc.

In this respect, it is to be noted that the optical path 114 leading from the objective 106 to the first optical subsystem 110 forms an infinity optical path, likewise. However, this infinite optically path is (at least in part) associated with both the first and second operating modes. Thus, it shall not be utilized for incorporating optical components exclusively determined for performing the second operating mode.

Just as an example, the objective 106 may be characterized by parameters as specified in conditions (1) to (5) mentioned above. Referring to FIG. 1, the working distance FAA of condition (3) designates a distance from an object-side front end of the objective 106 to the object field 116, the distanced of condition (4) designates a distance from the lens element 126 to the end surface 135 of the objective 106, and the diameter D of condition (5) designated a diameter of the object field 116 perpendicular to an optical axis direction. It is to be noted that the diameter D refers to the object field 116 which is imaged in the second operating mode. As may be understood from the above, the object field 116 associated with the second operating mode is larger than the object field associated with the first operating mode.

According to the present embodiment, the second magnification applied in the second operating mode may be in a range from 1.0 to 2.5. For the reasons explained above, image-side focusing rather than object-side focusing may be applied. For this purpose, the image sensor 148 may be shifted along an optical axis direction to implement focusing. In an alternative implementation of image-side focusing, the image sensor 148 is held fixed and the tube lens 146 is shifted along the optical axis.

Applying image-side focusing is particularly advantageous in case that the objective 106 is formed by an immersion objective. Thus, when utilizing image-side focusing rather than object-side focusing, any axial movement between the object 104 and the objective 106 can be avoided. Accordingly, an immersion medium 150 located between the object 104 and the objective 106 remains unaffected by focusing. In case of using an immersion objective, the imaging device 102 may comprise a dispenser 152 supplying the immersion medium 150 into the space between the object 104 and the front end of the objective 106.

It is to be noted that the invention shall not be limited to the embodiment described above. In particular, any type of microscope may be used for implementing an image acquisition with two different magnifications being switchable by inserting an optical module which includes a positive lens element located close to the exit pupil of an objective. For instance, a light sheet microscope may be used, e.g. in OPM or SCAPE configuration.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 optical imaging device
104 object
106 objective
108 optical system
110 first optical subsystem
112 second optical subsystem
114 optical path
116 object field
118 optical module
120 tube lens
122 image plane
126 lens element with positive refractive power
128 light deflector
130 exit pupil
132 housing
134 end surface
136 optical side path
138 Keplerian telescope system
140 lens element
142 real image of the exit pupil
144 aperture stop
146 tube lens
148 image sensor
150 immersion medium
152 dispenser

The invention claimed is:

1. An optical imaging device for a microscope, comprising:
an objective configured to collect detection light from an object and to guide the detection light into an optical path, and
an optical system comprising a plurality of lens elements configured to interact with the objective for optically imaging the object selectively in a first operating mode and a second operating mode,
wherein the optical system comprises a first optical subsystem associated with the first operating mode, the first optical subsystem being configured to form a first image of the object with a first magnification,
wherein the optical system comprises a second optical subsystem associated with the second operating mode, the second optical subsystem being configured to form a second image of the object with a second magnification, the second magnification being less than the first magnification,
wherein the second optical subsystem comprises an optical module insertable into the optical path for selecting the second operating mode, the optical module comprising a first lens element with a first positive refractive power causing the second magnification to be less than the first magnification by being closer to an exit pupil of the objective than other lens elements of the optical system when the optical module is inserted into the optical path,
wherein the second optical subsystem comprises a Keplerian telescope system having a most object-side lens element being formed by the first lens element with the first positive refractive power.

2. The optical imaging device according to claim 1, wherein the optical module further comprises a light deflector configured to branch an optical side path from the optical path when the optical module is inserted into the optical path, the second image being formed in the optical side path.

3. The optical imaging device according to claim 1, wherein the Keplerian telescope system is configured to form an image of the exit pupil.

4. The optical imaging device according to claim 3, wherein the second optical subsystem comprises an aperture stop located at a position of the image of the exit pupil, the image of the exit pupil being formed as a real image.

5. The optical imaging device according to claim 1, wherein the Keplerian telescope system comprises a second lens element with a second positive refractive power configured to collimate light bundles of the detection light, each light bundle being associated with a single point of an object field from which the objective collects the detection light.

6. The optical imaging device according to claim 5, wherein the second optical subsystem comprises a tube lens configured to focus the detection light onto an image plane.

7. The optical imaging device according to claim 6, wherein the second optical subsystem comprises an image sensor located in the image plane.

8. The optical imaging device according to claim 6, wherein at least one of the second lens element and the tube lens is configured to correct residual aberration of the first lens element with the first positive refractive power included in the optical module.

9. The optical imaging device according to claim 1, wherein the second magnification is in a range from 1.0 to 2.5.

10. The optical imaging device according to claim 1, wherein the second magnification is essentially equal to a ratio of an object-side refractive index and an image-side refractive index.

11. The optical imaging device according to claim 1, wherein the second optical subsystem is configured to perform an image-side focusing onto the object.

12. The optical imaging device according to claim 11, wherein the second optical subsystem is configured to perform the image-side focusing such that an object-side defocusing in the amount of 5 mm being compensated by the image-side focusing results in a predetermined integral light intensity received by one pixel of an image sensor included in the second optical subsystem, the predetermined integral light intensity being not less than 50% of an integral reference light intensity received by the pixel in a nominal focus state of the second optical system.

13. The optical imaging device according to claim 1, wherein the objective is formed by an immersion objective.

14. The optical imaging device according to claim 13, comprising a dispenser configured to supply an immersion medium to the objective.

15. The optical imaging device according to claim 1, wherein at least one of the following conditions is satisfied:

$$f \leq 30 \text{ mm}; \quad (1)$$

$$NA \geq 0.8; \quad (2)$$

$$FAA \geq 1 \text{ mm}; \quad (3)$$

$$d \leq 30 \text{ mm}; \quad (4)$$

$$D > 4.5 \text{ mm}; \quad (5)$$

wherein
f designates a focal length of the objective;
NA designates a full numerical aperture of the objective in the second operating mode;
FAA designates a free working distance;
d designates a distance from the first lens element with positive refractive power to an image-side end of the objective; and
D designates a diameter of an object field from which the objective collects the detection light in the second operating mode.

16. A microscope, comprising an optical imaging device according to claim 1.

17. A method for imaging an object, the method comprising:
collecting detection light from the object and focusing the detection light into an optical path using an objective, and
selectively imaging the object in a first operating mode and a second operating mode by using an optical system comprising a plurality of lens elements interacting with the objective,
wherein a first image of the object is formed with a first magnification in the first operating mode,
wherein a second image of the object is formed with a second magnification in the second operating mode, the second magnification being less than the first magnification,
wherein an optical module is inserted into the optical path for selecting the second operating mode, the optical module comprising a first lens element with a positive refractive power causing the second magnification to be less than the first magnification by being closer to an exit pupil of the objective than other lens elements of the optical system when the optical module is inserted into the optical path, wherein the second optical subsystem comprises a Keplerian telescope system having a most object-side lens element being formed by the first lens element with the first positive refractive power.

* * * * *